(12) United States Patent
Puveendiran et al.

(10) Patent No.: US 10,239,114 B2
(45) Date of Patent: Mar. 26, 2019

(54) SYSTEMS AND METHODS FOR TRANSPORTING MATERIAL

(71) Applicants: Jeevitha Puveendiran, Vaughan (CA); Ankit Sehgal, Alliston (CA); Carlos Manuel Figueroa, Alliston (CA); Ronald Richard Cook, Barrie (CA)

(72) Inventors: Jeevitha Puveendiran, Vaughan (CA); Ankit Sehgal, Alliston (CA); Carlos Manuel Figueroa, Alliston (CA); Ronald Richard Cook, Barrie (CA)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 15/010,776

(22) Filed: Jan. 29, 2016

(65) Prior Publication Data

US 2017/0217695 A1 Aug. 3, 2017

(51) Int. Cl.
| | |
|---|---|
| *B65G 65/34* | (2006.01) |
| *B65G 47/90* | (2006.01) |
| *B21J 13/10* | (2006.01) |
| *B25J 5/02* | (2006.01) |
| *B25J 9/00* | (2006.01) |

(52) U.S. Cl.
CPC ............... *B21J 13/10* (2013.01); *B25J 5/02* (2013.01); *B25J 9/0096* (2013.01)

(58) Field of Classification Search
CPC .......... B65G 47/90; B65G 65/34; B21J 13/10; B25J 5/02; B25J 9/0096

USPC .................................. 266/276; 164/63, 500
See application file for complete search history.

(56) References Cited

U.S. PATENT DOCUMENTS

| | | | |
|---|---|---|---|
| 4,345,747 A | 8/1982 | Laimer | |
| 4,751,956 A | 6/1988 | Benedetti | |
| 5,343,492 A | 8/1994 | Henn | |
| 6,073,678 A * | 6/2000 | Garza-Ondarza | B22D 47/00 164/130 |
| 8,820,592 B2 | 9/2014 | Boisdequin | |
| 2012/0043706 A1 | 2/2012 | Tamotsu | |

FOREIGN PATENT DOCUMENTS

| | | |
|---|---|---|
| CN | 1050553 C | 3/2000 |
| CN | 102632225 A | 3/2014 |
| CN | 204449282 U | 7/2015 |
| WO | 2010119777 A1 | 10/2010 |
| WO | 2010122900 A1 | 10/2010 |
| WO | 2015003890 A1 | 1/2015 |

* cited by examiner

*Primary Examiner* — Scott R Kastler
*Assistant Examiner* — Michael Aboagye
(74) *Attorney, Agent, or Firm* — Armstrong Teasdale LLP (57) ABSTRACT

A system for transporting material is provided. The system includes a container and a robot having a material-handling device for inserting the material into the container and removing the material from the container. The system also includes a track assembly having a track and at least one platform on which the robot and the container are mounted such that the robot and the container are movable along the track via the at least one platform.

18 Claims, 6 Drawing Sheets

SYSTEMS AND METHODS FOR TRANSPORTING MATERIAL

BACKGROUND

The present disclosure relates generally to transporting materials and, more particularly, to transporting hazardous materials within an industrial facility.

There is often a need to transport hazardous materials from one location to another within some known industrial facilities. In the interest of safety and efficiency, a stationary robot is often used to transport the hazardous materials between locations if the locations are within the robot's reach. However, it may be challenging and costly to transport hazardous materials between locations when one of the locations is not within the robot's reach. It would be useful, therefore, to provide systems and methods for safely and efficiently transporting hazardous materials between remote locations in an industrial facility.

BRIEF SUMMARY

In one aspect, a system for transporting material is provided. The system includes a container and a robot having a material-handling device for inserting the material into the container and removing the material from the container. The system also includes a track assembly having a track and at least one platform on which the robot and the container are mounted such that the robot and the container are movable along the track via the at least one platform.

In another aspect, a method for transporting material is provided. The method includes lifting a material with a material-handling device of a robot mounted on at least one platform of a track assembly. The method also includes inserting the material into a container using the material-handling device, wherein the container is mounted on the at least one platform of the track assembly. The method further includes moving the robot, the container, and the material along a track of the track assembly via the at least one platform with the material positioned within the container.

In yet another aspect, a method for transporting molten metal in a foundry is provided. The method includes extracting molten metal from a first holding area using a ladle of a robot mounted on at least one platform of a track assembly, and inserting the ladle and the molten metal into a container mounted on the at least one platform of the track assembly. The method also includes moving the robot, the container, and the molten metal along a track of the track assembly via the at least one platform with the ladle and the molten metal positioned within the container. The method further includes removing the ladle and the molten metal from the container after moving the robot, the container, and the molten metal along the track, and depositing the molten metal from the ladle into a second holding area using the robot.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to systems and methods for transporting material from one location to another within an industrial facility. In the embodiments described herein, the systems and methods use a stationary robot to transport material to a location that is not within the robot's reach. More specifically, the systems and methods described herein use a stationary robot and a container to transport hazardous material between remote locations. The systems and methods therefore facilitate reducing operator exposure to hazardous material by, for example, reducing the number of material-transport structures that need to be cleaned or handled by operators, which in turn may improve the level of safety in an industrial facility having a need to transport hazardous material. The systems and methods further facilitate increasing the number of locations to which material can be transported within an industrial facility, without increasing the number of stationary robots needed to transport material to those additional locations. As such, in the exemplary embodiment, the systems and methods increase the number of casting machines within a foundry without increasing the existing number of melt furnace(s) in the foundry, and without increasing the existing number of stationary robot(s) used in the foundry. More specifically, utilizing the systems and methods disclosed herein, existing robot(s) can transport molten metal from existing melt furnace(s) to all of the casting machines in a foundry, even if not all of the casting machines are within the reach of the existing robot(s). Thus, the systems and methods described herein facilitate increasing production capabilities of an industrial facility while minimizing capital expenditures and maintaining or improving the overall safety and efficiency of production in the industrial facility.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
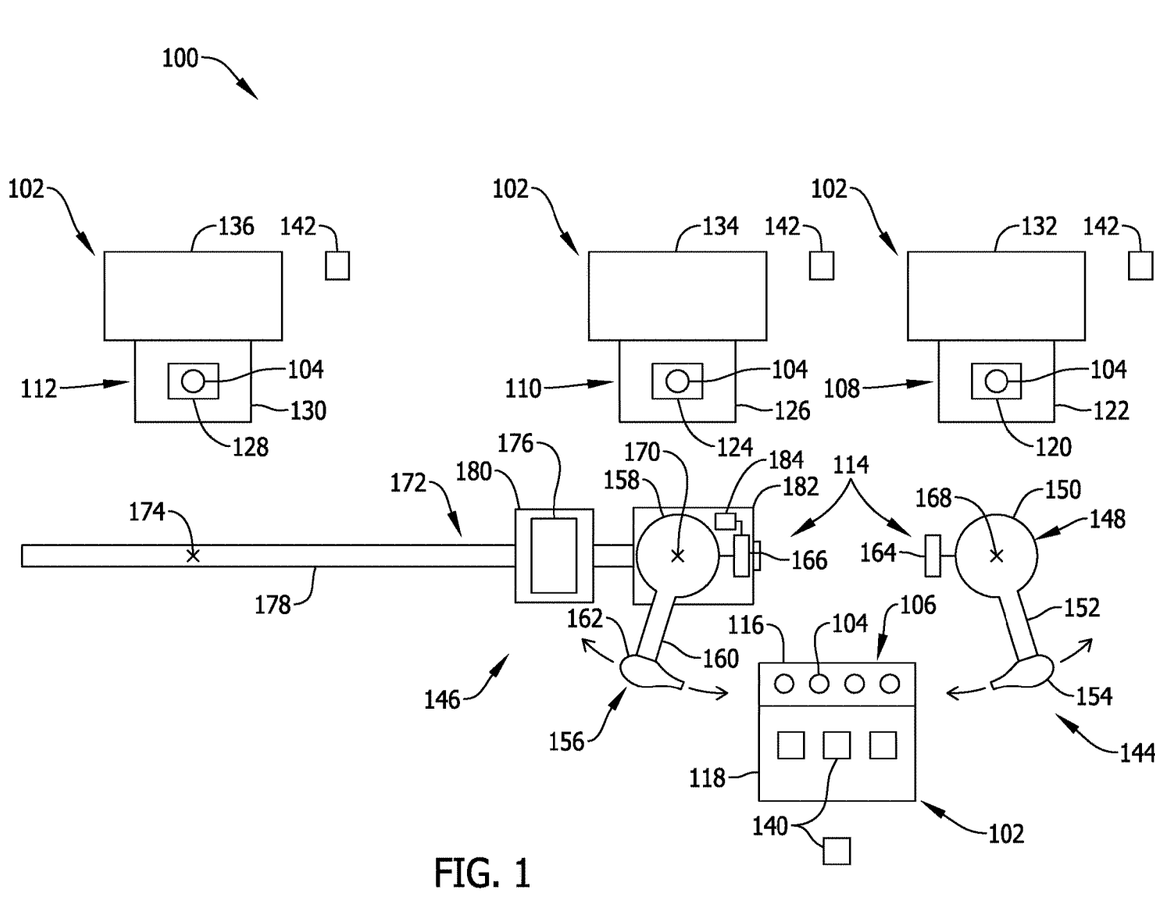
FIG. 1 is a schematic illustration of an exemplary station in an industrial facility.

FIG. 1 is a schematic illustration of an exemplary station 100 in an industrial facility. In the exemplary embodiment, the industrial facility is a foundry that produces automobile engine parts (e.g., cylinder blocks and heads) that are cast at station 100 (i.e., station 100 is a metal casting station). In other embodiments, the industrial facility may be any suitable type of factory that produces any suitable type of product. In the exemplary embodiment, station 100 includes a plurality of different locations 102 between which a hazardous material (e.g., molten metal 104 such as, for example, molten aluminum) is transported. As used herein, the term "hazardous material" refers to any material that could adversely affect nearby people or equipment during its transport from one location to another.

In the exemplary embodiment, station 100 includes a first supply 106 of molten metal 104, a second supply 108 of molten metal 104, a third supply 110 of molten metal 104, and a fourth supply 112 of molten metal 104. Molten metal 104 is transported from first supply 106 to one or more of second, third, and fourth supplies 108, 110, and 112, respectively, using a robot system 114, as set forth in more detail below. In the exemplary embodiment, first supply 106 includes a first holding area 116 (e.g., a dip well) that is heated by a first furnace 118, and second supply 108 includes a second holding area 120 (e.g., a vessel) that is heated by a second furnace 122. Similarly, in the exemplary embodiment, third supply 110 includes a third holding area 124 (e.g., a vessel) that is heated by a third furnace 126, and fourth supply 112 includes a fourth holding area 128 (e.g., a vessel) that is heated by a fourth furnace 130. In other embodiments, station 100 may have any suitable number of supplies arranged in any suitable configuration that facilitates enabling robot system 114 to function as described herein.

In the exemplary embodiment, second holding area 120 is in flow communication with a first casting machine 132 (e.g., a first low-pressure die casting machine), third holding area 124 is in flow communication with a second casting machine 134 (e.g., a second low-pressure die casting machine), and fourth holding area 128 is in flow communication with a third casting machine 136 (e.g., a third low-pressure die casting machine). During a casting operation at station 100, solid metal blocks 140 are melted via first furnace 118, and the resulting molten metal 104 is stored in first holding area 116. Robot system 114 periodically extracts molten metal 104 from first holding area 116 and transports the extracted molten metal 104 to second holding area 120, third holding area 124, and fourth holding area 128 for subsequent usage by first casting machine 132, second casting machine 134, and third casting machine 136, respectively, to produce castings 142. Notably, molten metal 104 stored in second holding area 120 is heated by second furnace 122 in advance of being used by first casting machine 132, and molten metal 104 stored in third holding area 124 is heated by third furnace 126 in advance of being used by second casting machine 134. Similarly, molten metal 104 stored in fourth holding area 128 is heated by fourth furnace 130 in advance of being used by third casting machine 136. In other embodiments, any of holding areas 116, 120, 124, and/or 128 may be in flow communication with any suitable type of machine, or may not be in flow communication with any machine(s). In such embodiments, holding areas 116, 120, 124, and/or 128 may temporarily store molten metal 104 in advance of the molten metal 104 being transported to another location within station 100, and/or to another station within the industrial facility.

Robot system 114 includes at least one robot assembly, namely a first robot assembly 144 and a second robot assembly 146 in the exemplary embodiment. First robot assembly 144 includes a first stationary robot 148 (e.g., a six-axis robot) having a first base 150, a first arm 152 coupled to first base 150, and a first ladle 154 (or other suitable basin) coupled to first arm 152. Similarly, second robot assembly 146 includes a second stationary robot 156 (e.g., a six-axis robot) having a second base 158, a second arm 160 coupled to second base 158, and a second ladle 162 (or other suitable basin) coupled to second arm 160. First robot 148 is communicatively coupled (e.g., tethered) to a first computing device 164 that facilitates maneuvering first arm 152 relative to first base 150 as described in more detail herein, and second robot 156 is communicatively coupled (e.g., tethered) to a second computing device 166 that facilitates maneuvering second arm 160 relative to second base 158 as described herein.

In other embodiments, robot system 114 may include any suitable number of robots having any suitable number of arms and ladles, and may be communicatively coupled to any suitable number of computing devices that facilitates enabling robot system 114 to function as described herein. For example, first robot 148 and/or second robot 156 may have its respective computing device 164 or 166 mounted within its respective base 150 or 158, rather than being mounted externally to its respective base 150 or 158 as shown in FIG. 1. Moreover, in other embodiments, first robot 148 and/or second robot 156 may include any suitable material-handling device in lieu of first ladle 154 and second ladle 162, respectively, that facilitates lifting and transporting solid or semi-solid material rather than liquid material as described herein. For example, rather than second ladle 162, second robot 156 may instead include a clamp, a clip, a hook, a magnet, and/or a fork that facilitates lifting solid material for transport between various locations as described herein. As used herein, the term "stationary robot" refers to a robot that is not capable of relocating or repositioning its own base (i.e., a robot that is not capable of autonomously moving its own base from one location to another).

Because first holding area 116 is in relatively close proximity to second holding area 120, first robot 148 can reach both first holding area 116 and second holding area 120 with first ladle 154 when first base 150 is positioned at a first location 168. Moreover, because first holding area 116 is in relatively close proximity to third holding area 124, second robot 156 can also reach both first holding area 116 and third holding area 124 with second ladle 162 when second base 158 is positioned at a second location 170. However, because first holding area 116 is not in close proximity to fourth holding area 128, second robot 156 cannot reach both first holding area 116 and fourth holding area 128 with second ladle 162 when second base 158 is at second location 170. Thus, second robot assembly 146 also includes a track assembly 172 along which second robot 156 is selectively movable between second location 170 (where second robot 156 can reach first holding area 116 with second ladle 162 via second arm 160) and a third location 174 (where second robot 156 can reach fourth holding area 128 with second ladle 162 via second arm 160). To facilitate containing spillage of molten metal 104 from second ladle 162 when second robot 156 is being moved from second location 170 to third location 174 via track assembly 172, second robot assembly 146 also includes a container 176 that is movable via track assembly 172 concurrently with second robot 156. As set forth in more detail below, as second robot 156 is transitioned along track assembly 172 in the exemplary embodiment, second ladle 162 is within container 176.

In the exemplary embodiment, track assembly 172 includes a track (e.g., a rail assembly 178), a first platform 180 that is slidably coupled to rail assembly 178, and a second platform 182 that is coupled to first platform 180 and is slidably coupled to rail assembly 178. Additionally, track assembly 172 also includes a motor 184 that is mounted to second platform 182 and is operable to selectively move second platform 182 along rail assembly 178 together with first platform 180. In other embodiments, track assembly 172 may have any other suitable configuration that enables track assembly 172 to function as described herein.

In the exemplary embodiment, container 176 is mounted to first platform 180, and second robot 156 is mounted to second platform 182. Second computing device 166 is also mounted to second platform 182 and is communicatively coupled to both second robot 156 and to container 176 to operate second robot 156 and container 176 as described herein. Although container 176 and second robot 156 are mounted on separate platforms 180 and 182, respectively, in the exemplary embodiment, container 176 and second robot 156 may each be mounted together on a single platform in other embodiments. Moreover, although second computing device 166 is mounted to second platform 182 in the exemplary embodiment, second computing device 166 may be mounted to first platform 180 or any suitable structure that is spaced from platforms 180 and 182 such that second computing device 166 is not movable concurrently with second robot 156 and container 176 via track assembly 172. Moreover, in other embodiments, track assembly 172 may have any suitable track (e.g., track assembly 172 may have a running board in lieu of rail assembly 178, such that platforms 180 and 182 may have a suitable arrangement of wheel(s) that roll on the running board to transport material between locations 102 in the manner set forth herein).

During a casting operation at station 100, first robot assembly 144 and second robot assembly 146 periodically transport molten metal 104 from first holding area 116 to second holding area 120, third holding area 124, and fourth holding area 128 to facilitate maintaining a predetermined level of molten metal 104 in holding areas 120, 124, and 128 that enables continuous production of castings 142 via first casting machine 132, second casting machine 134, and third casting machine 136, respectively. In other words, first robot assembly 144 and second robot assembly 146 periodically replenish holding areas 120, 124, and 128 with molten metal 104 from first holding area 116 such that continuous production of castings 142 at casting machines 132, 134, and 136 is not interrupted (i.e., such that first casting machine 132 can extract molten metal 104 from second holding area 120 on demand, such that second casting machine 134 can extract molten metal 104 from third holding area 124 on demand, and such that third casting machine 136 can extract molten metal 104 from fourth holding area 128 on demand).

To transport molten metal 104 from first holding area 116 to second holding area 120, first computing device 164 operates first robot 148 to pivot first arm 152 towards first holding area 116, extract molten metal 104 from first holding area 116 into first ladle 154, pivot first arm 152 towards second holding area 120, and deposit molten metal 104 from first ladle 154 into second holding area 120. To transport molten metal 104 from first holding area 116 to third holding area 124, second computing device 166 first ensures that second base 158 of second robot 156 is positioned at second location 170 by moving second platform 182 towards second location 170 along rail assembly 178 via motor 184 as needed. When second base 158 is positioned at second location 170, second computing device 166 operates second robot 156 to pivot second arm 160 towards first holding area 116, extract molten metal 104 from first holding area 116 into second ladle 162, pivot second arm 160 towards third holding area 124, and deposit molten metal 104 from second ladle 162 into third holding area 124.

To transport molten metal 104 from first holding area 116 to fourth holding area 128, second computing device 166 first ensures that second base 158 of second robot 156 is positioned at second location 170 by moving second platform 182 towards second location 170 along rail assembly 178 via motor 184 as needed. When second base 158 is positioned at second location 170, second computing device 166 operates second robot 156 to pivot second arm 160 towards first holding area 116, extract molten metal 104 from first holding area 116 into second ladle 162, pivot second arm 160 towards container 176, and place second ladle 162 within container 176. Second computing device 166 then closes container 176 before moving second platform 182 towards third location 174 along rail assembly 178 via motor 184 to position second base 158 at third location 174, such that first platform 180 and container 176 move along rail assembly 178 together with second robot 156.

Upon positioning second base 158 at third location 174, second computing device 166 opens container 176, and then operates second robot 156 to remove second ladle 162 from container 176, pivot second arm 160 towards fourth holding area 128, and deposit molten metal 104 from second ladle 162 into fourth holding area 128. After depositing molten metal 104 from second ladle 162 into fourth holding area 128, second computing device 166 then pivots second arm 160 towards container 176 and places second ladle 162 back in container 176, before closing container 176, and moving second platform 182 towards second location 170 along rail assembly 178 to reposition second base 158 at second location 170. Notably, second computing device 166 may move second robot 156 along rail assembly 178 between second location 170 and third location 174 according to any suitable schedule that facilitates ensuring that third holding area 124 and fourth holding area 128 are adequately replenished with molten metal 104 as set forth above (e.g., second computing device 166 may move second robot 156 along rail assembly 178 to replenish third holding area 124, then to replenish fourth holding area 128, then to replenish third holding area 124 again, then to replenish fourth holding area 128 again, and so on).

Optionally, station 100 (e.g., second robot assembly 146) may have a suitable configuration of sensors (e.g., optical sensors) that are utilized by first computing device 164 and/or second computing device 166 when performing a suitable algorithm of tasks (e.g., when progressing through the actions set forth above). For example, in one embodiment, second computing device 166 may await confirmation from sensor(s) that container 176 is open before placing second ladle 162 into container 176. In another embodiment, for example, second computing device 166 may await confirmation from sensor(s) that container 176 is closed before operating motor 184 to move second robot 156 and container 176 along rail assembly 178. Various other actions taken by first computing device 164 and/or second computing device 166 may also be predicated upon confirmation from at least one sensor that a particular event has occurred.

Figure 2:
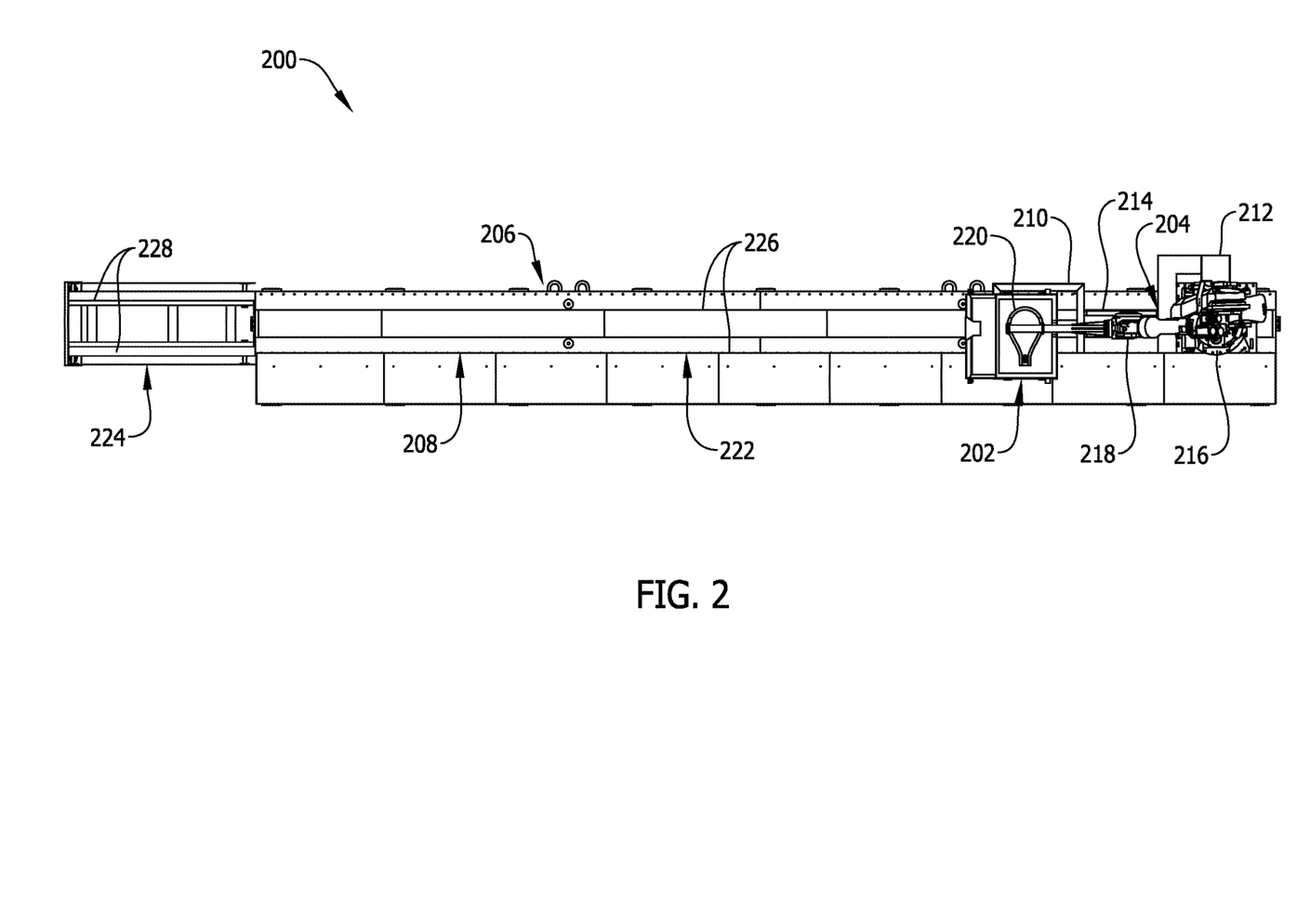
FIG. 2 is a plan view of an exemplary robot system that may be used in the station shown in FIG. 1.
Figure 3:
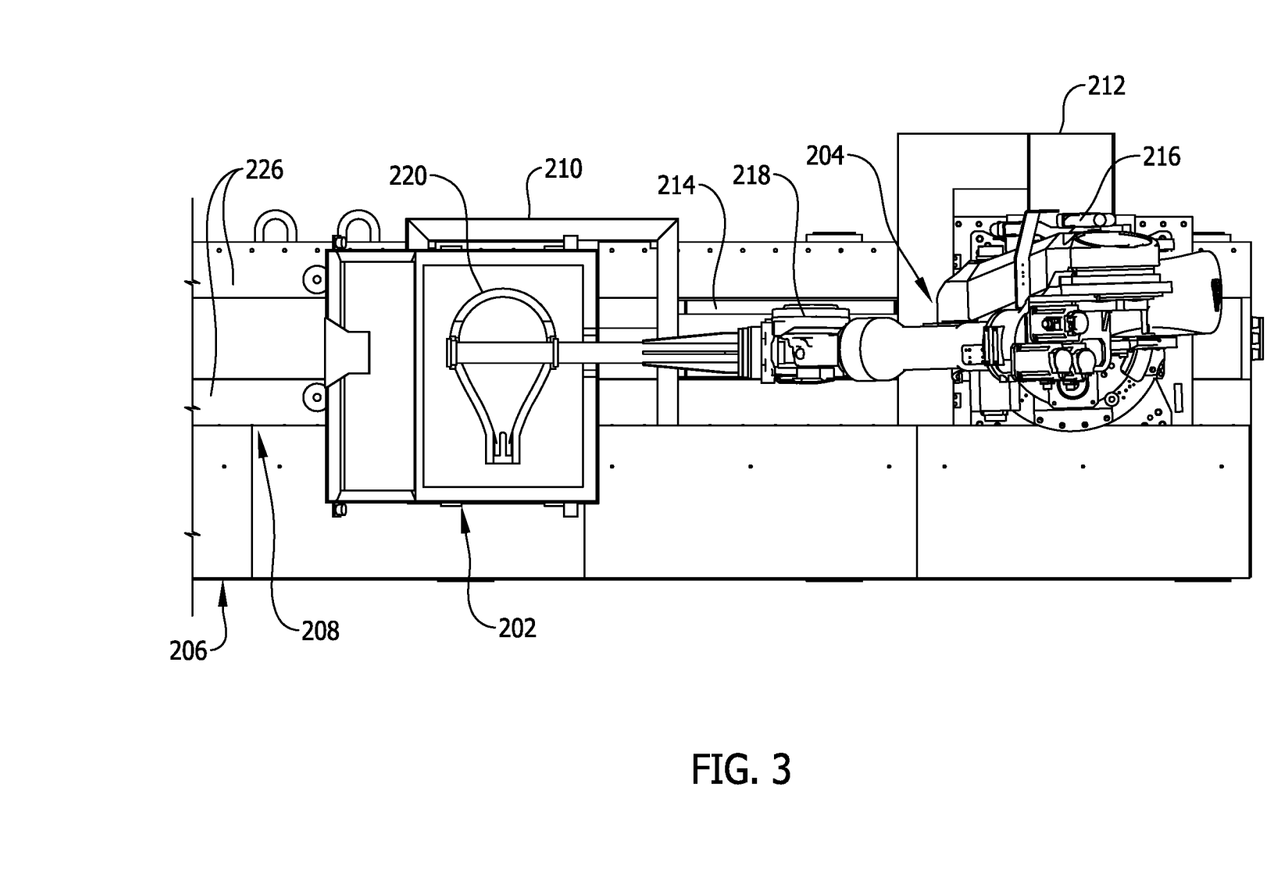
FIG. 3 is an enlarged portion of the robot system shown in FIG. 2.
Figure 4:
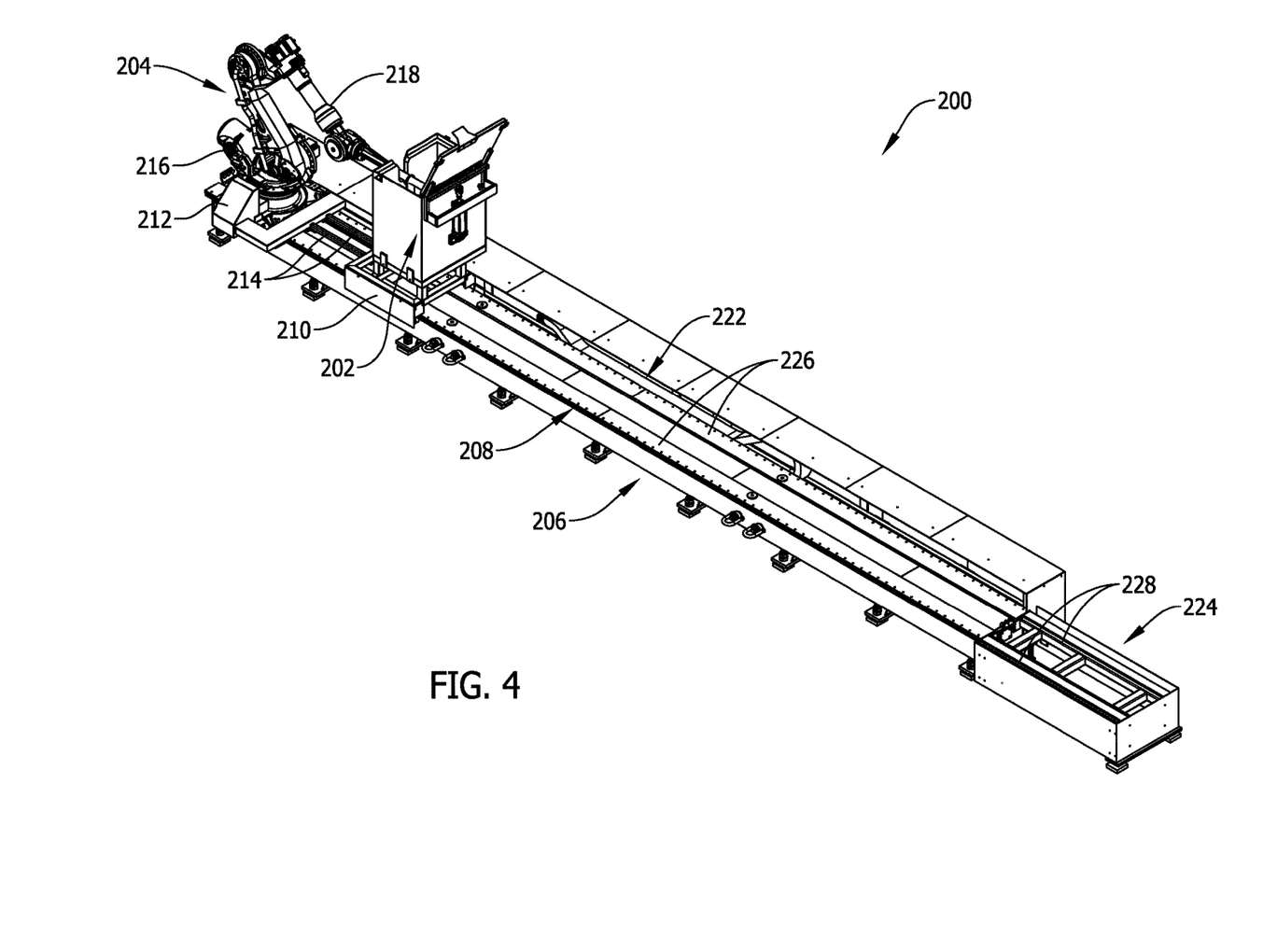
FIG. 4 is a perspective view of the robot system shown in FIG. 2.

FIGS. 2-4 are various views of an exemplary robot assembly 200 for use in robot system 114 as second robot assembly 146. In the exemplary embodiment, robot assembly 200 includes a container 202, a stationary robot 204, and a track assembly 206 along which container 202 and robot 204 are movable. Track assembly 206 includes a track (e.g., a rail assembly 208), a first platform 210 that is slidably coupled to rail assembly 208, and a second platform 212 that is slidably coupled to rail assembly 208. Second platform 212 is coupled to first platform 210 via at least one link 214 that enables first platform 210 and second platform 212 to move along rail assembly 208 in unison. Container 202 is mounted on first platform 210, and robot 204 is mounted on second platform 212. Robot 204 has a base 216, an arm 218 pivotably coupled to base 216, and a ladle 220 coupled to arm 218. In other embodiments, track assembly 206 may include any suitable number of platforms arranged in any suitable manner.

In the exemplary embodiment, rail assembly 208 has a main section 222 and an extension section 224 that is removably coupled to main section 222. Main section 222 has a pair of side-by-side main rails 226, and extension section 224 has a pair of side-by-side rail extensions 228. Each rail extension 228 is aligned with a respective main rail 226 when extension section 224 is coupled to main section 222 such that at least first platform 210 is movable along main rails 226 and rail extensions 228. Notably, robot assembly 200 is designed to be positioned in station 100 with extension section 224 of rail assembly 208 generally aligned with fourth furnace 130 such that extension section 224 supports first platform 210 and container 202 when base 216 of robot 204 is positioned at third location 174. Because extension section 224 is removable from main section 222, servicing (e.g., cleaning) of fourth furnace 130 can be made easier. In other embodiments, rail assembly 208 may have any suitable number of extension sections arranged in any suitable manner (e.g., rail assembly 208 may not have an extension section in some embodiments).

Figure 5:
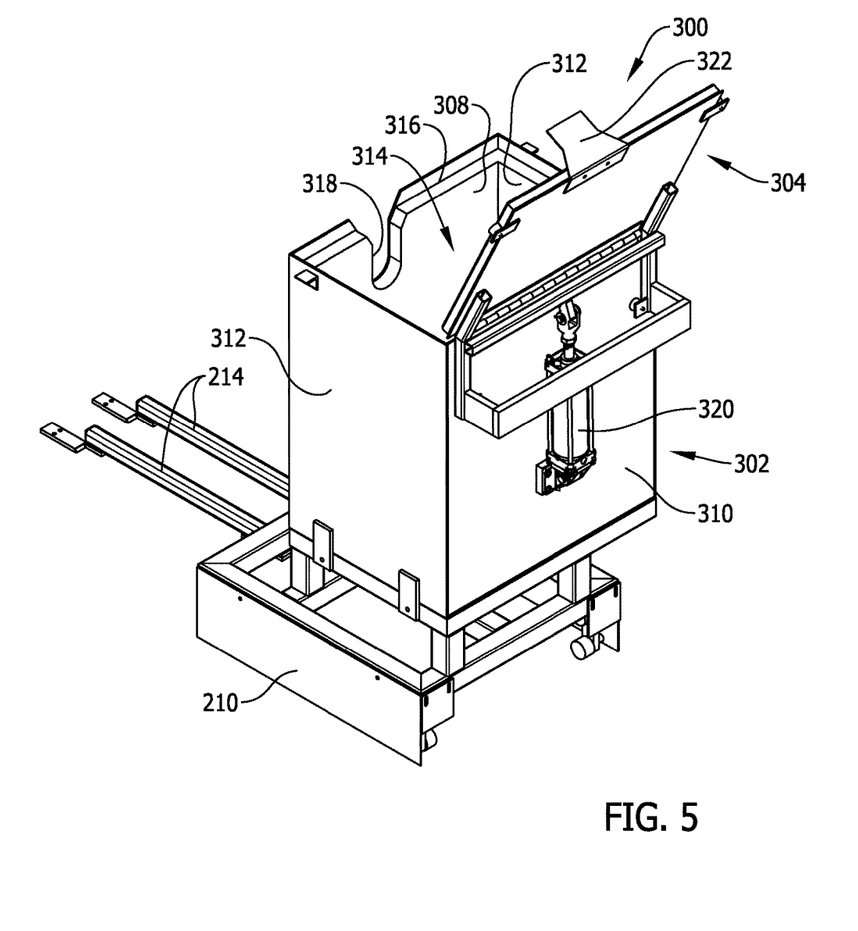
FIG. 5 is a rear perspective view of a container of the robot system shown in FIG. 2.
Figure 6:
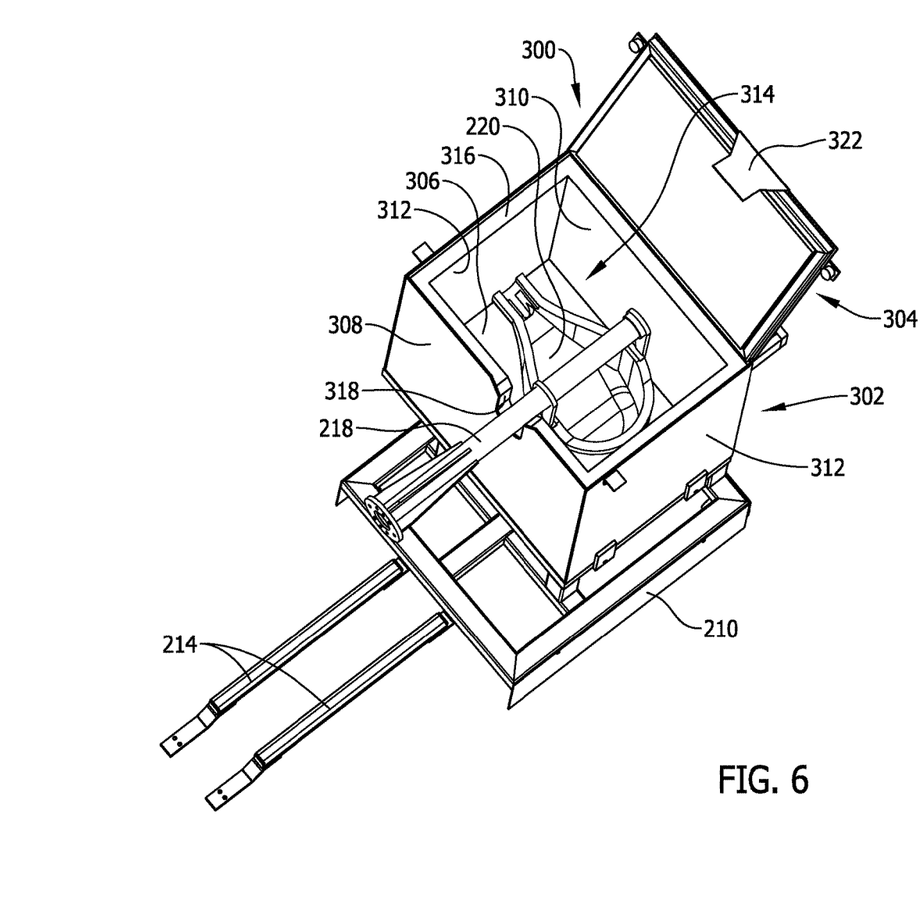
FIG. 6 is a front perspective view of the container shown in FIG. 5 with a ladle positioned therein.

FIGS. 5 and 6 are perspective views of an exemplary container 300 for use in robot assembly 200. In the exemplary embodiment, container 300 includes a base 302 and a lid 304 that are thermally insulated. Base 302 includes a bottom wall 306 with a front wall 308, a back wall 310, and a pair of sidewalls 312 projecting from bottom wall 306 to define an interior space 314 and a rim 316. A notch 318 is defined in front wall 308 at rim 316, and lid 304 is hingedly coupled to back wall 310 and is operable (e.g., openable and closable) via a linear actuator 320 (e.g., a pneumatic cylinder) that is mounted to back wall 310 and coupled to lid 304. Lid 304 includes a plate 322 for covering part of notch 318 when lid 304 is closed. As such, during a casting operation at station 100, linear actuator 320 is operable by second computing device 166 for opening lid 304 to permit insertion of ladle 220 into, and removal of ladle 220 from, interior space 314, and for closing lid 304 when ladle 220 is positioned within interior space 314, as set forth above.

Notably, when ladle 220 is positioned within interior space 314, arm 218 of robot 200 is seated within and extends through notch 318 as shown in FIG. 6, and plate 322 substantially covers the remainder of notch 318 (i.e., the part of notch 318 that is not occupied by arm 218) when lid 304 is closed. Thus, when ladle 220 is positioned within interior space 314 and lid 304 is closed, ladle 220 is nearly completely enclosed within container 300 to facilitate containing spillage from ladle 220 during transport of molten metal 104 along track assembly 206. In other embodiments, base 302 and/or lid 304 may not be thermally insulated, and lid 304 may be operable using any suitable actuator in lieu of, or in combination with, linear actuator 320. Alternatively, rather than having lid 304 which is openable for lowering ladle 220 into interior space 314 from above, container 300 may instead have a suitable door on, or in lieu of, front wall 308, back wall 310, and/or one or more of sidewalls 312 to facilitate inserting ladle 220 into, and removing ladle 220 from, interior space 314 from the front, back, and/or side(s) of container 300. As such, any suitable notch (or other opening) may be formed in any suitable wall of container 300 to accommodate arm 218 of robot 204 when ladle 220 is placed within interior space 314.

The above-described embodiments include at least the following technical effects: (1) providing a robot assembly that enables a stationary robot to transport material between locations when one of the locations is not within the reach of the robot; (2) providing a robot assembly that enables hazardous material to be contained in a container during transport from one location to another; and (3) providing a robot assembly with a stationary robot that is positioned on a platform that is movable along a track assembly for transporting the robot from one location to another. As such, the embodiments facilitate transporting materials in a safer and more efficient manner.

The systems and methods described herein facilitate transporting material from one location to another within an industrial facility. For example, the systems and methods described herein use a stationary robot to transport material to a location that is not within the robot's reach. As such, the systems and methods described herein use a stationary robot and a container to transport hazardous material between remote locations. The systems and methods thereby facilitate reducing operator exposure to hazardous material (e.g., by reducing the number of material-transport structures that need to be cleaned or handled by operators), which may improve the level of safety in an industrial facility in which there is a need to transport hazardous material. Moreover, the systems and methods also facilitate increasing the number of locations to which material can be transported within an industrial facility, without increasing the number of stationary robots needed to transport material to those additional locations. For example, the systems and methods increase the number of casting machines within a foundry without increasing the existing number of melt furnace(s) in the foundry, and without increasing the existing number of stationary robot(s) used in the foundry (i.e., the existing number of robot(s) can transport molten metal from the existing number of melt furnace(s) to all of the casting machines in a foundry, even if not all of the casting machines are within the reach of the existing robot(s)). Thus, the systems and methods described herein facilitate increasing production capabilities of an industrial facility while minimizing capital expenditures and maintaining or improving the overall safety and efficiency of production in the industrial facility.

Exemplary embodiments of systems and methods for transporting material are described above in detail. The systems and methods are not limited to the specific embodiments described herein, but rather, components of the systems and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

Some embodiments involve the use of one or more electronic or computing devices. Such devices typically include a controller or processing device such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by the controller or processing device, cause the controller or processing device to perform at least some of the method steps described herein. The above examples are exemplary only, and thus are not intended to limit in any way the definition and/or meaning of the terms controller and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for transporting material from a first location to a second location, said method comprising:
   extracting, at the first location, first molten material from a molten material supply with a material-handling device of a robot mounted on at least one platform of a track assembly, wherein the molten material supply holds material heated by a furnace at the first location, and wherein the at least one platform is moveably coupled to a track of the track assembly;
   transporting the molten material to a first casting machine at the first location by pivoting the robot between the molten material supply and the first casting machine;
   depositing, at the first location, the first molten material into the first casting machine;
   extracting, at the first location, second molten material from the molten material supply with the material-handling device;
   inserting, at the first location, the material-handling device into an interior space defined by a container, wherein the container is mounted on the at least one platform of the track assembly;
   moving both of the robot and the container from the first location to the second location via the track while the material-handling device is positioned within the interior space of the container;
   removing the material-handling device from the interior space at the second location after moving the robot and the container along the track; and
   depositing, with the material-handling device, the second molten material into a second casting machine at the second location.

2. The method of claim 1 wherein extracting second molten material with a material-handling device comprises collecting the second molten material in a ladle.

3. The method of claim 2 further comprising closing a lid of the container with the second molten material positioned within the container before moving the container along the track.

4. The method of claim 1 wherein extracting second molten material with a material-handling device comprises extracting the second molten material with a stationary robot.

5. The method of claim 4 wherein extracting the second molten material with a stationary robot comprises lifting the second molten material with a six-axis robot.

6. A method for transporting molten metal in a foundry from a first location to a second location, said method comprising:
   extracting, at the first location, first molten metal from a first holding area of a molten material supply using a ladle of a robot mounted on at least one platform of a track assembly, wherein the first holding area holds molten metal heated by a furnace at the first location, and wherein the at least one platform is moveably coupled to a track of the track assembly;
   transporting the molten material to a first casting machine at the first location by pivoting the robot between the first holding area and a second holding area of the first casting machine;
   depositing, at the first location, the first molten metal into the second holding area of the first casting machine;
   extracting, at the first location, second molten metal from the first holding area of the molten material supply;
   inserting, at the first location, the ladle and the second molten metal into an interior space defined by a container mounted on the at least one platform of the track assembly;
   moving the robot, the container, and the second molten metal from the first location to the second location via the track while the ladle and the second molten metal are positioned within the interior space of the container;
   removing the ladle and the second molten metal from the interior space of the container at the second location after moving the robot, the container, and the second molten metal along the track; and
   depositing, at the second location, the second molten metal from the ladle into a third holding area of a second casting machine using the robot.

7. The method of claim 6 further comprising:
   closing a lid of the container before moving the robot, the container, and the second molten metal along the track; and
   opening the lid of the container before removing the ladle and the second molten metal from the container.

8. A system for transporting material from a first location to a second location, said system comprising:
   a molten material supply at the first location, said molten material supply holding molten material heated by a furnace;
   a first casting machine at the first location;
   a second casting machine at the second location;
   a robot comprising a material-handling device for extracting the molten material from said molten material supply, wherein said robot is operable to transport the molten material from said molten material supply to said first casting machine by pivoting between said molten material supply and said first casting machine;
   a container defining an interior space; and
   a track assembly comprising a track and at least one platform on which said robot and said container are mounted, said at least one platform moveably coupled to said track such that said robot and said container are both movable from the first location to the second location via said track, wherein said robot is operable to transport molten material from said molten material supply to said second casting machine by extracting the molten material with said material-handling device from said molten material supply at the first location, inserting said material-handling device into said interior space at the first location, holding said material-handling device within said interior space while said robot and said container move along said track, and removing said material-handling device from said interior space at the second location to deposit the molten material into said second casting machine.

9. The system of claim 8 wherein said material-handling device is a ladle.

10. The system of claim 8 wherein said robot is a stationary robot.

11. The system of claim 10 wherein said robot is a six-axis robot.

12. The system of claim 8 wherein said container comprises a lid.

13. The system of claim 8 wherein said container is thermally insulated.

14. The system of claim 8 wherein said track comprises a rail assembly.

15. The system of claim 8 wherein said at least one platform comprises a first platform on which said container is mounted, and a second platform on which said robot is mounted.

16. The system of claim 15 wherein said first platform is coupled to said second platform such that said platforms are movable along said track in unison.

17. The system of claim 8 wherein said material-handling device is at least one of a clamp, a clip, a hook, a magnet, and a fork configured to lift and transport a solid or semi-solid material.

18. The system of claim 8 wherein said track assembly further comprises a motor operable to selectively move said at least one platform between the first location and the second location.

* * * * *